US008099590B2

(12) United States Patent
Okamoto et al.

(10) Patent No.: US 8,099,590 B2
(45) Date of Patent: Jan. 17, 2012

(54) IMAGE FORMING APPARATUS AND PROCESSING METHOD OF REVISING BASIC SETTINGS

(75) Inventors: Yuji Okamoto, Soraku-gun (JP); Naofumi Ueda, Kizugawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 723 days.

(21) Appl. No.: 12/219,974

(22) Filed: Jul. 31, 2008

(65) Prior Publication Data

US 2009/0037716 A1 Feb. 5, 2009

(30) Foreign Application Priority Data

Aug. 1, 2007 (JP) ................................. 2007-201156

(51) Int. Cl.
*G06F 15/177* (2006.01)
(52) U.S. Cl. ........... 713/2; 713/100; 717/169; 358/1.15; 358/504; 399/18
(58) Field of Classification Search .................. 713/1, 2, 713/100; 358/1.15, 504; 399/18
See application file for complete search history.

(56) References Cited

U.S. PATENT DOCUMENTS

| 5,729,350 | A | * | 3/1998 | Ozaki ........................... 358/296 |
| 6,147,698 | A | * | 11/2000 | Zable et al. ................... 347/240 |
| 6,438,687 | B2 | * | 8/2002 | Klein ............................... 713/1 |
| 7,145,687 | B2 | * | 12/2006 | Nishikawa et al. ........... 358/1.18 |

FOREIGN PATENT DOCUMENTS

| JP | 04-276479 | 10/1992 |
| JP | 04-281475 | 10/1992 |
| JP | 08-328770 | 6/1995 |
| JP | 2001-142667 | 11/1999 |
| JP | 2000-322215 | 11/2000 |
| JP | 2005-063113 | 10/2003 |
| JP | 2005-49548 | 2/2005 |
| JP | 2007-058604 | 3/2007 |

OTHER PUBLICATIONS

English translation of Japan Pub. No. 2000-322215.*

* cited by examiner

*Primary Examiner* — Thuan Du
(74) *Attorney, Agent, or Firm* — David G. Conlin; Steven M. Jensen; Edwards Wildman Palmer LLP

(57) ABSTRACT

When a setting input through a control portion falls within the first setup range, the settings in the first setup storage are rewritten with the setting in the second setup storage. Since the setting was revised, the revision history including the setup content and the data of the setting is stored in a revision history storage. Next, a determination process for the revised setting is carried out. Specifically, it is determined whether a usually expected input setting from the control portion falls within the second setup range. When it does not fall within the second setup range, the controller determines that the input setting is not a proper value, and reads out the setting before revision, stored in the third setup storage to rewrite the settings in the first setup storage with it.

8 Claims, 12 Drawing Sheets

FIG.5A

| 8-6 | |
|---|---|
| PURPOSE | ADJUSTMENT, OPERATIONAL TEST, CHECK |
| FUNCTION (PURPOSE) | USED FOR OPERATION CHECK AND ADJUSTMENT OF THE TRANSFER CHARGER VOLTAGE AND ITS CONTROL CIRCUIT (TRANSFER MODE) |
| SECTION | PROCESS (PHOTORECEPTOR, DEVELOPMENT, TRANSFER, CLEANING)/TRANSFER |

| | | ITEM | SETUP RANGE | DEFAULT |
|---|---|---|---|---|
| 1 | FRONT | FRONT SIDE PRINT MODE | 0 TO 800 | 350 |
| 2 | BACK | BACK SIDE PRINT MODE | | 350 |

FIG.5C

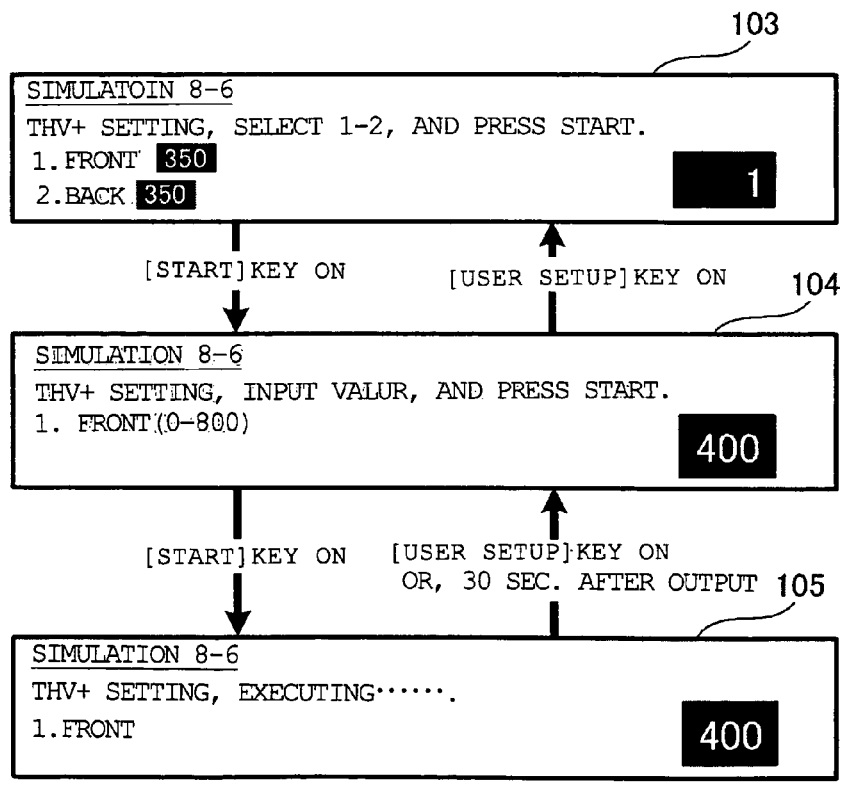

SIMULATOIN 8-6
THV+ SETTING, SELECT 1-2, AND PRESS START.
1. FRONT 350
2. BACK 350
1
103

[START] KEY ON     [USER SETUP] KEY ON

SIMULATION 8-6
THV+ SETTING, INPUT VALUR, AND PRESS START.
1. FRONT (0-800)
400
104

[START] KEY ON     [USER SETUP] KEY ON OR, 30 SEC. AFTER OUTPUT

SIMULATION 8-6
THV+ SETTING, EXECUTING······.
1. FRONT
400
105

FIG.6A

| 8-19 | |
|---|---|
| PURPOSE | ADJUSTMENT, OPERATIONAL TEST, CHECK |
| FUNCTION (PURPOSE) | USED FOR OPERATION CHECK AND ADJUSTMENT OF THE FIXING BIAS VOLTAGE AND ITS CONTROL CIRCUIT |
| SECTION | FIXING |

| ITEM | | ADJUSTMENT VR |
|---|---|---|
| FIXING BIAS(-) | FBIAS | VR 101 |
| FIXING BIAS(+) | | FR 102 |

SIMULATION 8-19
FUSING BIAS CHECK, SELECT 1, AND PRESS START.
1. FBIAS

1

[START] KEY ON          [USER SETUP] KEY ON
                        OR, 30 SEC. AFTER OUTPUT

SIMULATION 8-19
FUSING BIAS CHECK.. EXECUTING···.
1. FBIAS

FIG.7A

| | | 121 |
|---|---|---|
| 43-1 | | |

| PURPOSE | SETUP |
|---|---|
| FUNCTION (PURPOSE) | USED FOR SETTING FIXING TEMPERATURES FOR VARIOUS OPERATIONAL MODES |
| SECTION | FIXING, PAPER DISCHARGE |
| ITEM | OPERATION |

| 1 | INSIDE NORMAL | INSIDE FIXING ROLLER/NORMAL MODE | 185 |
|---|---|---|---|
| 2 | OUTSIDE NORMAL | OUTSIDE FIXING ROLLER/NORMAL MODE | 185 |
| 3 | INSIDE PREHEAT | INSIDE FIXING ROLLER/PREHEAT MODE | 140 |
| 4 | OUTSIDE PREHEAT | OUTSIDE FIXING ROLLER/PREHEAT MODE | 140 |
| 5 | LEFT NORMAL | LEFT SIDE OF SUB-HEAT ROLLER/NORMAL MODE | 185 |
| 6 | LEFT PREHEAT | LEFT SIDE OF SUB-HEAT ROLLER/PREHEAT MODE | 140 |

FIG.7C

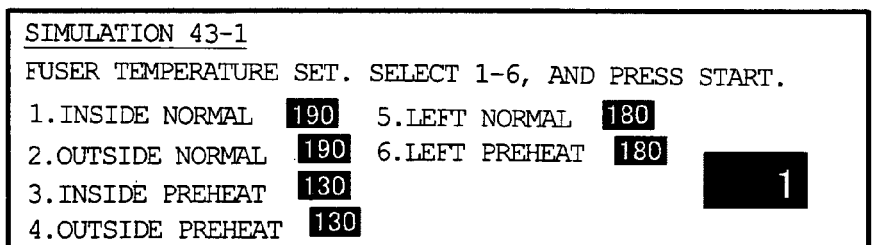

[START] KEY ON        [USER SETUP] KEY ON

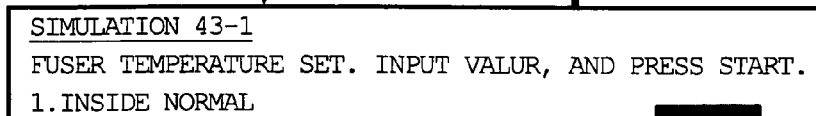

FIG.8A 43-3

| PURPOSE | SETUP (ADJUSTMENT) |
|---|---|
| FUNCTION (PURPOSE) | SETUP OF ROTATIONAL SPEED OF FIXING ROLLER |
| SECTION | FIXING |
| ITEM | OPERATION |

| | ITEM | SETUP RANGE | DEFAULT |
|---|---|---|---|
| 1 | NORMAL | 0~99 | 36 |
| 2 | SLOWDOWN | 0~99 | 50 |

FIG.8C

SIMULATION 43-3
FUSER MOTOR SPEED SETTING. SELECT 1-2, AND PRESS START.
1. NORMAL    36
2. SLOWDOWN  50
                                       1

[START] KEY ON ↓    ↑ [USER SETUP] KEY ON

SIMULATION 43-3
FUSER MOTOR SPEED SETTING. INPUT VALUR, AND PRESS START.
1. NORMAL
                                       36

FIG.9A

| | | 141 |
|---|---|---|
| 46-31 | | |
| PURPOSE | ADJUSTMENT | |
| FUNCTION (PURPOSE) | SHARPNESS ADJUSTMENT IN COPY MODE | |
| SECTION | | |
| ITEM | IMAGE QUALITY | |

| | ITEM | | SETUP RANGE | DEFAULT |
|---|---|---|---|---|
| 1 | OC_AE | AE MODE(OC) | 1~5 | 3 |
| 2 | OC_CHARA | CHARACTER MODE(OC) | | |
| 3 | OC_MX | CHARACTER/PHOTO MODE(OC) | | |
| 4 | OC_PHOTO | PHOTO MODE(OC) | | |
| 5 | SPF1_AE | AE MODE(SPF1) | | |
| 6 | SPE1_CHARA | CHARACTER MODE(SPF1) | | |
| 7 | SPE1_MIX | CHARACTER /PHOTO MODE(SPF1) | | |
| 8 | SPE1_PHOTO | PHOTO MODE(SPF1) | | |
| 9 | SPE2_AE | AE MODE(SPF2) | | |
| 10 | SPE2_CHARA | CHARACTER MODE(SPF2) | | |
| 11 | SPE2_MIX | CHARACTER /PHOTO MODE(SPF2) | | |
| 12 | SPE2_PHOTO | PHOTO MODE(SPF2) | | |
| 13 | OS_AE | AE MODE(CIS) | | |
| 14 | OS_CHARA | CHARACTER MODE(CIS) | | |
| 15 | OS_MIX | CHARACTER /PHOTO MODE(CIS) | | |
| 16 | OS_PHOTO | PHOTO MODE(CIS) | | |

*SPF1: DSPF FOR FRONT SIDE (COD)   SPF2: DSPF FOR BACK SIDE(OCD)

FIG.9C

SIMULATION 46-31
SHARPNESS LEVEL SETUP. SELECT 1-12, AND PRESS START.
  1.OC_AE [3]          2.OC_CHARA [3]       3.OC_MIX [3]
  4.OC_PHOTO [3]       5.SPF1_AE [3]        6.SPF1_CHARA [3]
  7.SPF1_MIX [3]       8.SPF1_PHOTO [3]     9.SPF2_AE [3]
  10.SPF2_CHARA [3]    11.SPF2_MIX [3]      12.SPF2_PHOTO [3]
  13.CIS_AE [3]        14.CIS_CHARA [3]     15.CIS_MIX [3]
  16.CIS_PHOTO [3]

[START]KEY ON ↓         ↑ [USER SETUP]KEY ON

SIMULATION 46-31
SHARPNESS LEVEL SETUP. INPUT VALUR 0-3, AND PRESS START.
1. OC_AE
                                                          [3]

FIG.10A

| 61-2 | | 151 |
|---|---|---|
| PURPOSE | ADJUSTMENT | |
| FUNCTION (PURPOSE) | USED FOR ADJUSTMENT OF LASER POWER (ABSOLUTE VALUE) IN COPY MODE | |
| SECTION | SCANNER(WRITING) UNIT (LSU) | |
| ITEM | OPERATION | |

| | ITEM | | SETUP RANGE | DEFAULT |
|---|---|---|---|---|
| 1 | AE | AUTO EXPOSURE MODE | 20~119 | 44 |
| 2 | CHARA | CHARACTER MODE | | 50 |
| 3 | MIX | CHARACTER/PHOTO MODE | | 50 |
| 4 | PHOTO | PHOTO MODE | | 50 |

FIG.10C

```
SIMULATION 61-2
LASER POWER SETTING(COPY). SELECT 1-4, AND PRESS START.
1.AE  44    2.CHARA  50
3.MIX 50    4.PHOTO  50                         1
```

↓ [START]KEY ON          ↑ [USER SETUP]KEY ON
                            OR [START]KEY ON

```
SIMULATION 61-2
LASER POWER SETTING(COPY). INPUT VALUR 20-119, AND PRESS START.
1.AE
                                                44
```

IMAGE FORMING APPARATUS AND PROCESSING METHOD OF REVISING BASIC SETTINGS

This Nonprovisional application claims priority under 35 U.S.C. §119(a) on Patent Application No. 2007-201156 filed in Japan on 1 Aug. 2007, the entire contents of which are hereby incorporated by reference.

BACKGROUND OF THE INVENTION (1) Field of the Invention

The present invention relates to an image forming apparatus and its processing method of revising basic settings, whereby the validity of input data is determined at the time of setup in manager setup mode, based on the content of input and the number of times of input.

(2) Description of the Prior Art

Recently, in image forming apparatuses such as copiers, facsimile machines, printers, etc., the basic settings have been stored in non-volatile memory, and they are permitted to be revised only when a service person or a machine's manager inputs a password. Because the basic settings of the apparatus include the settings for input timings of sensors in the scanner, printing portion, paper feed portion and the like, the settings for the operational timings of motors/solenoids from the sensor inputs, the settings for the fixing temperature and the like, if the settings are carelessly revised it becomes not only impossible to perform fine image forming but also the apparatus will not operate at all due to a timing error when some incorrect sensor timings are set up.

Since some malfunctioning such as margin offset, color imbalance, poor fixing performance or the like occurs when the basic settings need be rewritten, the service person will modify the basic settings of the apparatus. However, when the apparatus is in such a state that it can at least continue to operate and its recorded material can also be used as long as some inconvenience is endured, if an inexperienced manager etc. attempts to modify the basic settings of the apparatus carelessly, there may occur cases where the apparatus becomes inoperative or the recorded material becomes unusable, causing the problem that the situation not only becomes worse but also it takes long time to restore the original status from the ill-setting.

As a technology of preventing such ill-setting, patent document 1 (Japanese Patent Application Laid-open 2005-49548) discloses a configuration in which, when the user is determined to be a person who often makes key-operational errors in normal mode, the operating mode is switched from the normal mode into operating error protection mode so as to allow the user who makes few mistakes to operate in the normal mode and allow the user who often makes mistakes to operate in the operating error protection mode, to thereby prevent operational errors.

In the technology of patent document 1, since users who make many mistakes are recognized to switch the operation into the operating error protection mode, operational errors can be reduced. However, in the case of the basic setup of the apparatus, once a setting mistake is committed, there is the possibility that the apparatus will not work completely in the worst case. That is, it is possible for the technology of patent document 1 to reduce operational errors, but it is impossible to deal with erroneous setup. As a result, when the apparatus will not operate or the recorded material is not available due to ill-setting, the problem that a long time is needed to recover the original status from the ill-setting cannot be solved at all.

SUMMARY OF THE INVENTION

In order to solve the above problem, it is an object of the present invention to provide an image forming apparatus and a processing method of revising the basic settings, whereby the settings can be prevented from being rewritten when an ill-setting was made and the original settings can be easily restored even if an ill-setting was made.

The first aspect of the present invention is an image forming apparatus comprising: a first storage for storing basic settings of the apparatus; an input portion for inputting a revised setting for revising the basic settings stored in the first storage; a second storage for storing the revised setting input through the input portion; and a controller, and is characterized in that the controller performs the steps of: determining whether the input revised setting falls within a predetermined range; rewriting the basic settings stored in the first storage with the revised setting stored in the second storage when the revised setting falls within the predetermined range; and, keeping the basic settings stored in the first storage as they are when the revised setting falls out of the predetermined range.

The second aspect of the present invention is an image forming apparatus comprising: a first storage for storing basic settings of the apparatus; an input portion for receiving input of a revised setting for revising the basic settings stored in the first storage; a second storage for storing the revised setting input through the input portion; a third storage for storing the basic settings before revision that have been stored in the first storage; and a controller, and is characterized in that the controller performs the steps of: determining whether the input revised setting falls within a predetermined range; rewriting the basic settings stored in the first storage with the revised setting stored in the second storage when the revised setting falls within the predetermined range; and, rewriting the settings stored in the first storage with the basic settings stored in the third storage when the revised setting falls out of the predetermined range.

In the third aspect of the present invention, the aforementioned image forming apparatus further includes a revision history storage for storing the setup revision history including the number of setting revision times, and is characterized in that the controller, based on the setup revision history of the revision history storage, rewrites the revised setting stored in the first storage with the basic setting stored in the third storage when revisions of the same setting have been performed a predetermined number of times or more.

In the fourth aspect of the present invention, the aforementioned image forming apparatus is characterized in that the first setup range of a basic setting is defined as a predetermined range within which a setting is permissible as the basic setting, and the controller will not rewrite the basic settings stored in the first storage when the input revised setting falls out of the first setup range.

In the fifth aspect of the present invention, the aforementioned image forming apparatus is characterized in that the second setup range of a basic setting is defined as a range within which the basic setting is practically set, and the controller performs the steps of: temporarily rewriting the basic settings stored in the first storage with the revised setting stored in the second storage when the input revised setting falls within the first setup range; keeping the revised setting, stored in the first storage by revision as is when the revised setting falls within the second setup range; and rewriting the revised setting stored in the first storage with the basic setting stored in the third storage when the revised setting, stored in the first storage by revision falls out of the second setup range.

In the sixth aspect of the present invention, the aforementioned image forming apparatus is characterized in that the second setup range is narrower than the first setup range.

In the seventh aspect of the present invention, the aforementioned image forming apparatus is characterized in that when the basic settings stored in the first storage are not rewritten with the input revised setting, the controller gives a notice of that effect.

In the eighth aspect of the present invention, the aforementioned image forming apparatus is characterized in that the image forming apparatus is a scanner device, printer device, copier or a composite product having the functions in combination.

The ninth aspect of the present invention is a processing method of revising basic settings in an image forming apparatus that includes: a first storage for storing basic settings of the apparatus; an input portion for inputting a revised setting for revising the basic settings stored in the first storage; and a second storage for storing the revised setting input through the input portion, comprising the steps of: determining whether the revised setting input from the input portion falls within a predetermined range; rewriting the basic settings stored in the first storage with the revised setting stored in the second storage when the revised setting falls within the predetermined range; and, keeping the basic settings stored in the first storage as they are when the revised setting falls out of the predetermined range.

The tenth aspect of the present invention is a processing method of revising basic settings in an image forming apparatus that includes: a first storage for storing basic settings of the apparatus; an input portion for receiving input of a revised setting for revising the basic settings stored in the first storage; a second storage for storing the revised setting input through the input portion; and a third storage for storing the basic settings before revision that have been stored in the first storage, comprising the steps of: determining whether the revised setting input through the input portion falls within a predetermined range; rewriting the basic settings stored in the first storage with the revised setting stored in the second storage when the revised setting falls within the predetermined range; and, rewriting the settings stored in the first storage with the basic setting stored in the third storage when the revised setting falls out of the predetermined range.

Since the present invention is configured as above, when the input revised setting falls out of the predetermined range, the basic settings in the first storage that stores the basic settings to be applied to the apparatus are kept as they are. Accordingly, it is possible to avoid occurrence of a contingency that the apparatus becomes out of operation due to input of an erroneously revised setting.

Further, even if an erroneous setting is input to the first storage that stores the basic settings, the basic settings have been backed up beforehand in the third storage so as to be able to restore the original state, thus making it possible to secure the operation of the apparatus.

Further, since the revision history of the basic settings has been stored, it is possible to recognize that the revisions have been done by an inexperienced manager if the same item has been revised a predetermined number of times or more. Accordingly, even if the input setting (revised setting) falls within the predetermined range, there is a possibility of an operational error occurring in other control, so that the settings in the first storage are restored to the original status. As a result, it is possible to prevent occurrence of troubles such as hang-up of the apparatus due to operational mistakes.

Further, even if a numeric value was set within the permissible input range (first setup range), when the input numeric value falls out of the practical usage setup range (second setup range), the input setting is determined as being wrong and the basic settings before revision are restored, whereby the operation of the apparatus can be secured.

The first setup range within which input of a basic setting can be varied is set to be wide, taking into consideration a design change of the apparatus at the designing stage of the apparatus. However, since it is usual that the input for revision of settings is not changed by a large amount because revision is done for a fine adjustment, the second setup range based on which the determination portion discriminates is smaller than the first setup range.

BRIEF DESCRIPTION OF THE DRAWINGS

FIG. 5 is a diagram showing a setup display example of the transfer potential of a transfer device 35;

FIG. 6 is a diagram showing a setup display example of the fixing bias of a fixing device 37;

FIG. 7 is a diagram showing a setup display example of the fixing temperature of fixing device 37;

FIG. 8 is a diagram showing a setup display example of the rotational speed of the fixing roller in fixing device 37;

FIG. 9 is a diagram showing a setup display example of sharpness adjustment in copy mode;

FIG. 10 is a diagram showing a laser power setup example in copy mode;

DESCRIPTION OF THE PREFERRED EMBODIMENTS

The embodiment of the present invention will hereinafter be described with reference to the illustrated examples.

Figure 1:
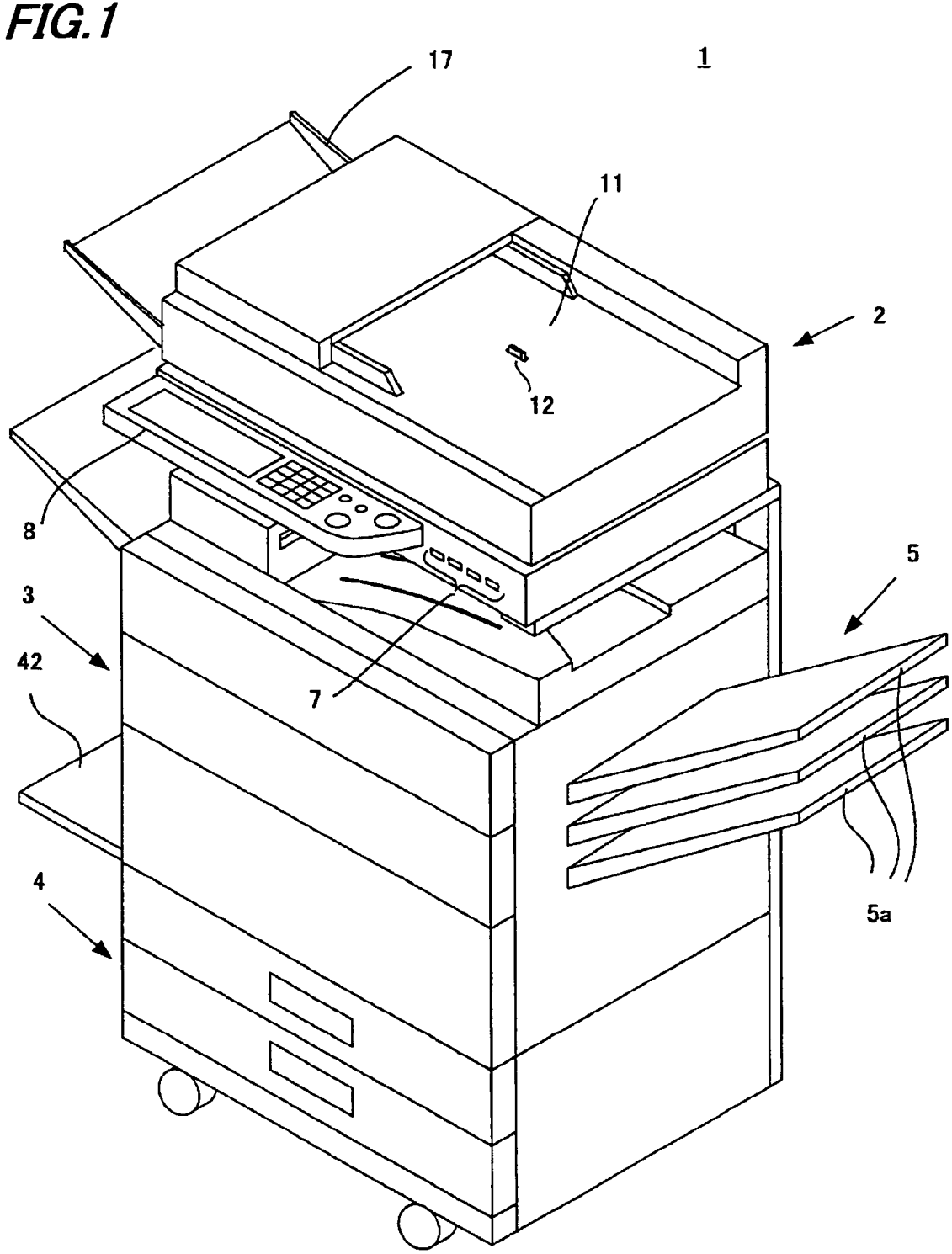
FIG. 1 is a perspective view showing one embodiment of a digital multifunctional machine of the present invention.
Figure 2:
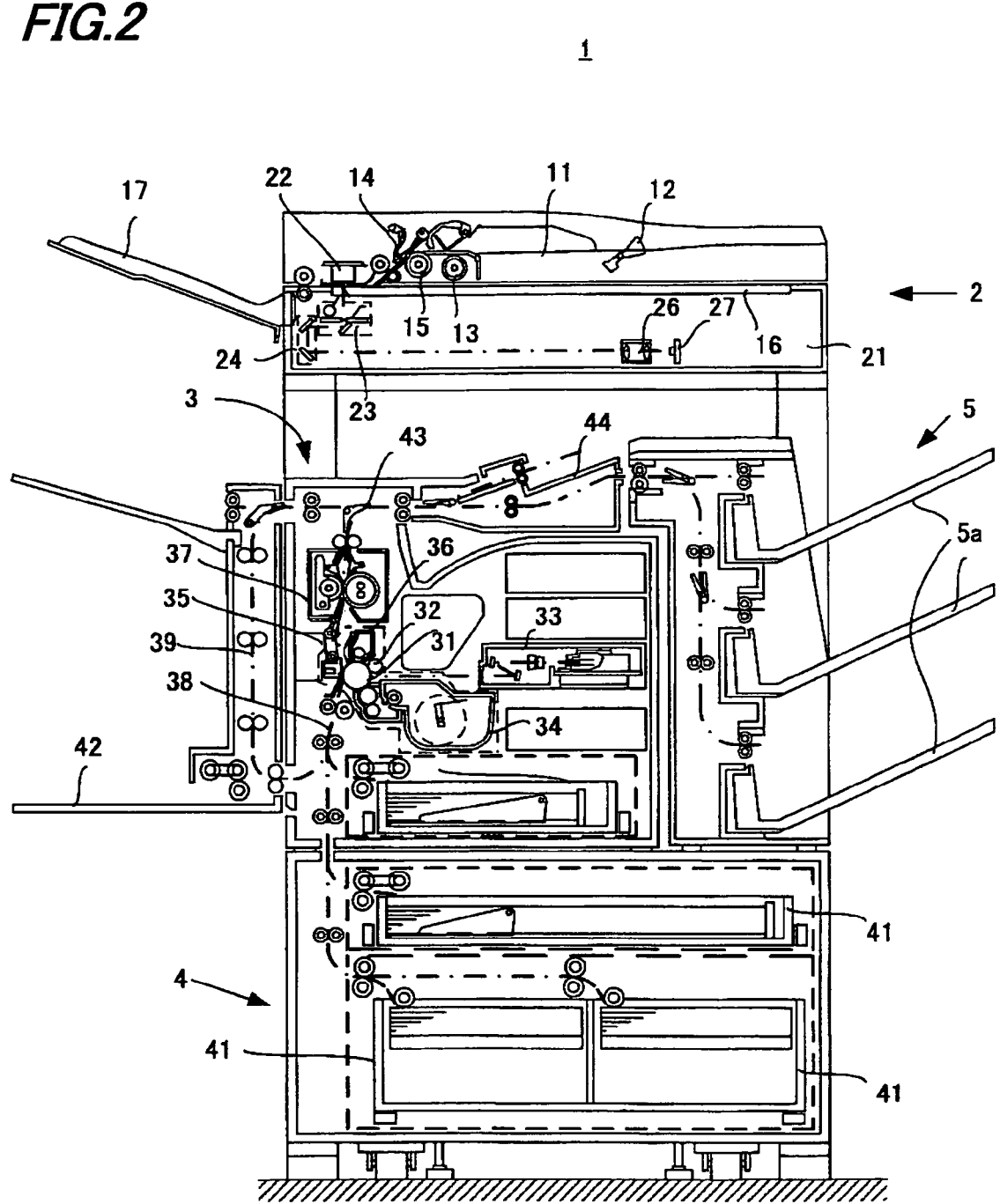
FIG. 2 is a sectional view showing one embodiment of a digital multifunctional machine.

FIGS. 1 and 2 are perspective and sectional views showing one embodiment of a digital multifunctional machine of the present invention. An image forming apparatus 1 as this digital multi-functional machine can be selectively used in copy mode for reading images from originals to print them out on recording sheets, in facsimile mode for reading images from originals to transmit and receiving images of originals to print them out on recording sheets, in printer mode for receiving images from information terminal devices via networks to print them out on recording sheets and in other modes. This image forming apparatus 1 essentially includes a document feeding and reading portion 2, an image forming portion 3, a paper feeder 4, a paper discharge processor 5 and a USB interface 7.

Next, the operation of image forming apparatus 1 will be described taking an example of the copy mode.

To begin with, as documents are set on a document set tray 11 of document feeding and reading portion 2, a document detecting sensor 12 detects the status as documents having been set. Then, a control portion 8 of the document feeding and reading portion 2 is operated so as to input settings of the size and the print paper, magnification ratio, etc. Thereafter, control portion 8 is operated to instruct the start of a copying operation.

In response to the control, document feeding and reading portion 2 pulls out documents, sheet by sheet, by means of a pickup roller 13 onto document set tray 11 and delivers the document by a separation plate 14 and a feed roller 15 to a platen glass 16 so that the document is conveyed in the sub-scan direction over platen glass 16 and discharged to a document output tray 17.

In the above operation, the front side (the under side) of the document is read by a first reader 21. That is, a first scan unit 23 of first reader 21 is moved and set at a predetermined position while a second scan unit 24 is positioned at a predetermined position. The front surface of the document is illuminated through platen glass 16 by the exposure lamp of first scan unit 23, and the light reflected off the document is lead by the reflection mirrors of first and second scan units 23 and 24 to an image focusing lens 26, which focuses the reflected light of the document on a CCD (charge coupled device) 27 to thereby read the image on the front face of the document.

On the other hand, the reverse face of the document (the upper side) of the document is read by a second reading portion 22. Second reading portion 22 is disposed over platen glass 16, and includes: an exposure lamp (LED (light emitting diode) array, fluorescent lamp or the like) for illuminating the rear side of the document; a Selfoc lens array for focusing the reflecting light from the original per pixel; and a contact image sensor (CIS) for photoelectrically converting the reflected light of the document, received through the Selfoc lens array to output analog image signals.

Also, the document may be placed on platen glass 16 by unfolding the upper body of document feeding and reading portion 2 so that the document surface can be read by means of first reader 21. In this case, first and second scan units 23 and 24 are moved in the sub scan direction keeping a predetermined speed relationship relative to each other while the document on platen glass 16 is illuminated by first scan unit 23, and the light reflected off the document is lead to image focusing lens 26 by means of first and second scan units 23 and 24 so that the image of the document is focused by image focusing lens 26 onto CCD 27.

When one or both sides of the document have been read in the above way, the image data representing one or dual sides of the document is input to the controller of a microcomputer etc., where the image data undergoes various image processes, and the processed image data is output to image forming portion 3.

Image forming portion 3 prints the document images represented by image data on recording paper and includes a photoreceptor drum 31, a charging device 32, a laser scan unit (which will be referred to hereinbelow as LSU) 33, a developing unit 34, a transfer device 35, a cleaning device 36, a charge erasing device (not shown) and a fixing unit 37.

Also, image forming portion 3 is equipped with a main feed path 38 and a reverse feed path 39. The recording paper delivered from paper feeder 4 is conveyed along main feed path 38. Paper feeder 4 draws recording paper, sheet by sheet, from a stack of recording paper, held in a paper feed cassette 41 or set on a manual feed tray 42 and delivers the recoding paper to main feed path 38 of image forming portion 3.

In the course of the recording paper being conveyed along main feed path 38 of image forming portion 3, the recording paper passes through and between photoreceptor drum 31 and transfer device 35 and then passes through fixing device 37 to complete printing for the recording paper. While photoreceptor drum 31 rotates in one direction, its surface is cleaned by cleaning device 36 and the charge erasing device and then charged uniformly by charging device 32. Laser scan unit 33 modulates the laser beam based on the image data from document feeding and reading portion 2 and repeatedly scans the laser beam over the photoreceptor drum 31 surface in the main scan direction, to form an electrostatic latent image on the photoreceptor drum 31 surface. Developing unit 34 supplies toner to the photoreceptor drum 31 surface and develops the electrostatic latent image to form a toner image on the photoreceptor drum 31 surface. Transfer device 35 transfers the toner image on the photoreceptor drum 31 surface to the recording paper which passes through the nip between the transfer device 35 and photoreceptor drum 31. Fixing device 37 heats and presses the recording paper to fix the toner image onto the recording paper.

Arranged at the junction of main feed path 38 and reverse feed path 39 is a branch claw 43. When printing is performed only on one side of recording paper, the recording paper is lead from fixing device 37 to a paper output tray 44 or paper discharge processor 5 by means of branch claw 43.

When printing is performed on both sides of recording paper, the recording paper is conducted to reverse feed path 39. Then, the recording paper passes through reverse feed path 39 and is inverted upside down to be fed to main feed path 38. Then, the recording paper is once again printed on its rear side in the course of main feed path 38 and lead to paper output tray 44 or paper discharge processor 5.

The recording paper thus printed is lead to paper output tray 44 or paper discharge processor 5 so that it is discharged to paper output tray 44 or discharged to any one of a plurality of paper output trays 5a of paper discharge processor 5.

In paper discharge processor 5, a plurality of recording sheets are sorted and discharged to different output trays 5a, and/or each set of recording sheets is punched or stapled. For example, when multiple copies of multiple originals are prepared, recording sheets are sorted and discharged to each paper output tray 5a so that each copy of multiple originals is allotted to different paper output tray 5a, and each set of recording sheets on paper output tray 5a is punched or stabled to prepare a printed matter.

Figure 3:
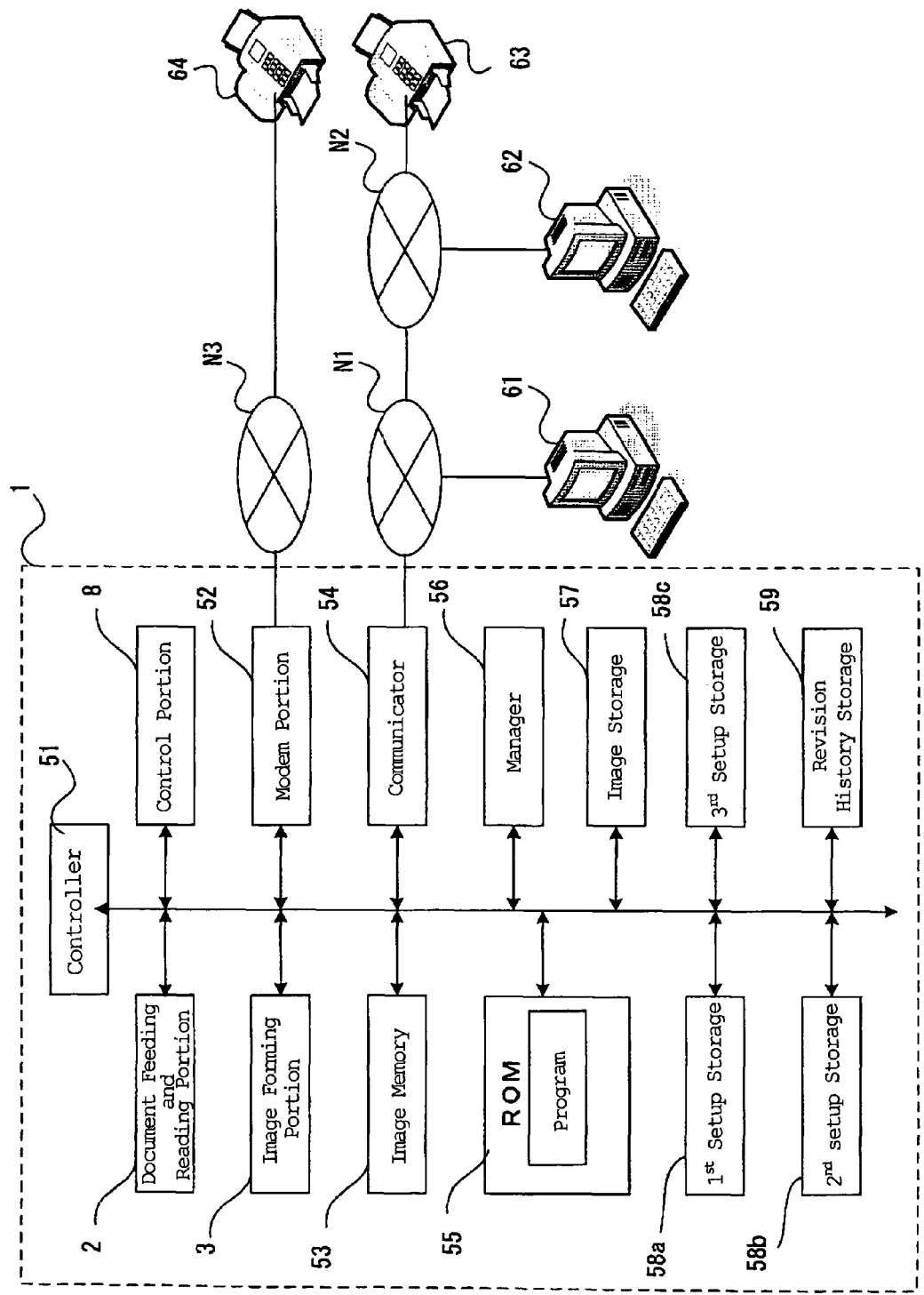
FIG. 3 is a diagram for illustrating the functions provided for an image forming apparatus of the present invention.

FIG. 3 is a diagram for illustrating the functions provided for image forming apparatus 1 of the present invention, showing a configurational example of a multi-functional machine including the functions of a copier, printer device, facsimile machine, scanner device, etc.

Image forming apparatus 1 includes a controller 51 comprised of a CPU for performing operations, RAM for temporarily storing data involved in the operations and other components. Connected to controller 51 are a ROM 55 for storing a control program for controlling image forming apparatus 1 and a manager 56 as a memory for storing management information for managing the processes that are performed by image forming apparatus 1. Document feeding and reading portion 2 for reading images from documents to produce image data is also connected to controller 51.

Further, controller 51 is also connected to an image memory 53 for temporarily storing image data and image forming portion 3 for forming images and recording them on recording paper based on the image data stored in image memory 53. Image forming apparatus 1 can temporarily store the image data generated by document feeding and reading portion 2 into image memory 53 and then form images at image forming portion 3. In this way, image forming apparatus 1 functions as a copier.

Further, in FIG. 3, controller 51 is connected to a modem unit 52 that performs facsimile communication. This modem unit 52 is connected to a public telephone network N3. Image forming apparatus 1 can transmit the image data generated by document feeding and reading portion 2 to another facsimile machine 64 through facsimile communication via public telephone network N3 connected to modem unit 52. Also, image forming apparatus 1 can receive the image data transmitted from another facsimile machine 64 via public telephone network N3 by modem unit 52 and can form images by image forming portion 3 from the received image data. In this way, image forming apparatus 1 functions as a facsimile machine.

Further, controller 51 is connected to a communicator (transmitter-receiver) 54 for performing transmission and reception of data with the outside. Communicator 54 can be connected to a communication network N1 such as an in-house LAN etc. This communication network N1 may have one or a plurality of personal computers 61 connected thereto. In a normal state where image forming apparatus 1 operates alone, communicator 54 is connected to communication network N1 and exchanges information with PC 61 via communication network N1.

Image forming apparatus 1 can transmit the image data generated by document feeding and reading portion 2 from communicator 54 to PC 61. In this way, image forming apparatus 1 functions as a scanner device. Further, image forming apparatus 1 receives the image data transmitted from PC 61 at communication 54 so as be able to form images at image forming apparatus 3 based on the received image data. In this way, image forming apparatus 1 functions as a printer device.

Communication network N1 is connected to a wide area communication network N2 such as the internet etc. Communicator 54 can receive image data from an information processor 62 or another facsimile machine 63 connected to wide area communication network N2 via communication network N1 and wide area communication network N2, by transmission of image data attached to an email or by any other method. In this way, image forming apparatus 1 can function as an internet facsimile machine.

Further, controller 51 is connected to control portion (command reception interface) 8 for receiving instructions from the user. Though detailed later, control portion 8 is comprised of a display portion such as an LCD panel etc. for displaying information required for operational control and an input portion such as a touch panel, ten keys, etc., through which control commands and other information are input by user control. Further controller 51 is connected to image storage 57 such a hard disk, optical disk and the like. Image storage 57 stores image data associated with image processing of image data generated by document feeding and reading portion 2 and the like. A first setup storage 58a, second setup storage 58b and third setup storage 58c store different basic settings of the apparatus. First setup storage 58a is of a non-volatile memory or the like to store the basic settings of the apparatus. Second setup storage 58b is of RAM or the like to temporarily store the modified settings input through controller 8. Third setup storage 58c is of RAM or the like to temporarily store the basic settings in first setup storage 58a as a backup. A revision history storage 59 stores the revision history of the settings, which includes the content of the settings and the number of times of revision of the settings.

Figure 4:
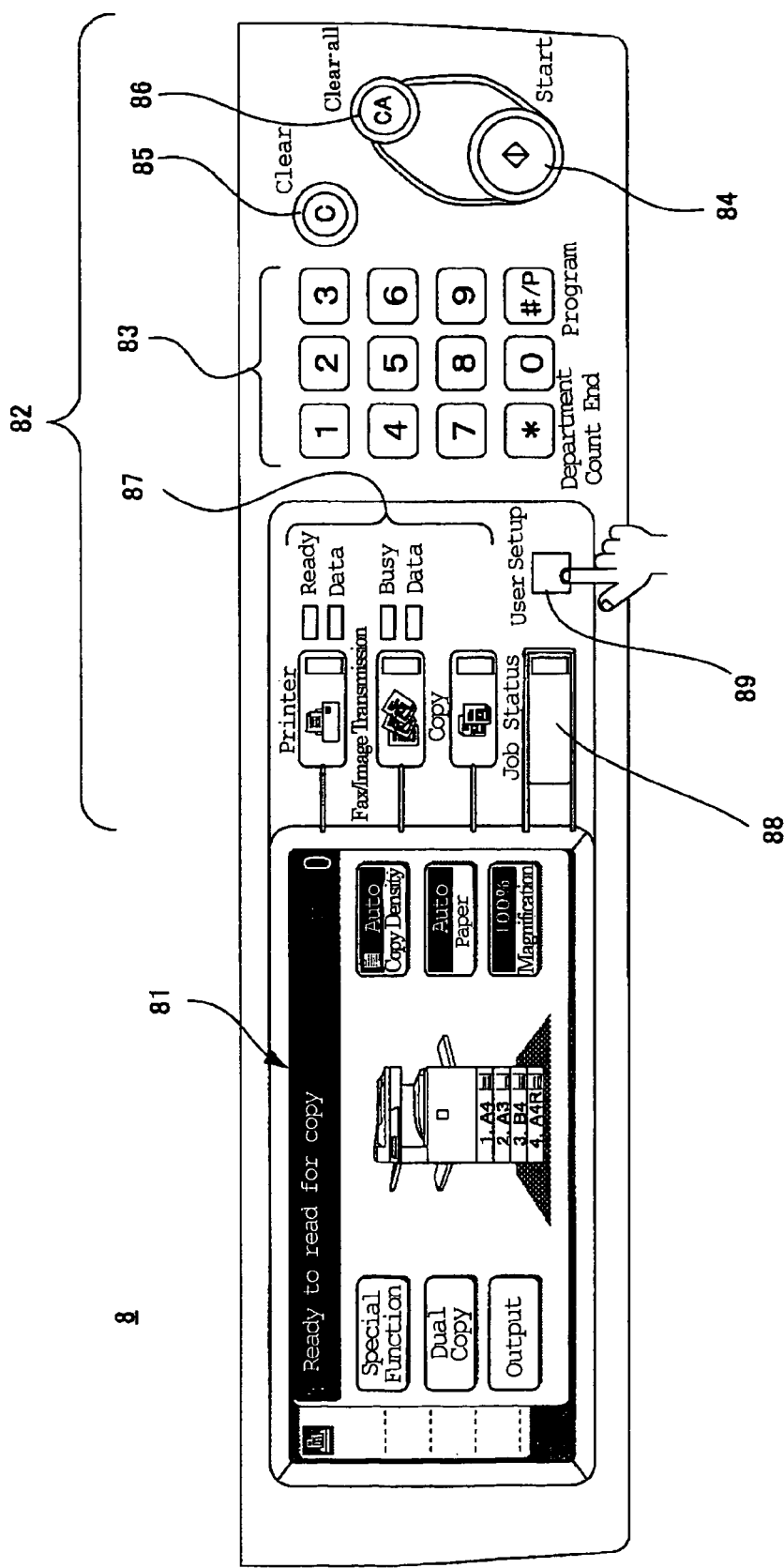
FIG. 4 is an illustrative view showing a control portion provided for the top panel of an image forming apparatus.

FIG. 4 is an illustrative view showing control portion 8 provided for the top panel of image forming apparatus 1. As shown in FIG. 4, control portion 8 includes a display portion 81 and an input portion 82.

Display portion 81 is constituted of a LCD panel so as to provide a pictorial representation in addition to figures and symbols. A touch-panel is formed over the top surface of the LCD panel so that the user can input by touching the input key areas displayed on the LCD panel.

Input portion 82 is to input instructions of settings, conditions, processing operations and the like to image forming apparatus 1. This input portion 82 includes at a ten-key pad 83 for input of the number of image forming, the number of sets, etc., a start key 84 for starting an image output operation, a clear key 85 for clearing input information, clear all key (CA key) 86 for clearing all the set conditions, a mode select key 87 for selection of copy mode, printer mode, facsimile mode and the like, a job status display key 88 for commanding selection and display of the status of the current image forming job and a user setup key 89 for performing user setting.

Display portion 81 displays a setup window for each mode when the user presses mode select key 87. When the user presses job status display key 88, a job status window is displayed. In display portion 81 shown in FIG. 4, a basic setup window in copy mode is displayed.

When the user presses user setup key 89 in this control portion 8 and further inputs a special code that is given from a service person or the like, through ten-key pad 83, it is possible to enter a special setup mode called a simulation mode. In this simulation mode, it is possible to actuate each function of the apparatus separately so as to check the operations of individual parts and set the parameters relating the operations such as the speeds, temperatures and other factors of the operations.

As the special code is entered, a setup display window corresponding to it is displayed in display portion 81. FIGS. 5 to 10 show display examples of items that can be set up in the simulation mode. In each set item, default values have been set and their variable ranges for setting are given. FIGS. 5A, 6A, 7A, 8A, 9A and 10A show contents of settings, FIGS. 5B, 6B, 7B, 8B, 9B and 10B show items of settings, and FIGS. 5C, 6C, 7C, 8C, 9C and 10C show actual input of settings.

In FIG. 6, FIG. 6A shows a setting content table 111 for displaying and setting the fixing bias in fixing unit 37. FIG. 6B shows a setting item table 112 to allow for selection of the fixing bias from VR101 and VR102. FIG. 6C shows an example of input display of this setting.

In FIG. 7, FIG. 7A shows a setting content table 121 for displaying and setting the fixing temperatures in fixing unit 37. As shown in a setting item table 122 of FIG. 7B, there are six kinds of temperatures to be set, and one of them is selected. FIG. 7C shows an example of input display of this setting.

In FIG. 8, FIG. 8A shows a setting content table 131 for displaying and setting the rotational speed of the fixing roller in fixing unit 37. As shown in a setting item table 132 of FIG. 8B, there are two kinds of rotational speeds to be set, and one of them is selected. FIG. 8C shows an example of input display of this setting.

In FIG. 9, FIG. 9A shows a setting content table 141 for displaying and setting the sharpness adjustment in copy mode. As shown in a setting item table 142 of FIG. 9B, there are sixteen kinds of modes to be set, and one of them is selected. FIG. 9C shows an example of input display of this setting.

In FIG. 10, FIG. 10A shows a setting content table 151 for displaying and setting the laser power in copy mode. As shown in a setting item table 152 of FIG. 10B, there are four kinds of laser power to be set, and one of them is selected. FIG. 10C shows an example of input display of this setting.

First, the operational procedures for setting the transfer potential shown in FIG. 5 will be described with reference to flow charts shown in FIGS. 11 and 12. Since the settings in FIGS. 6 to 10 are designated in the same process as in FIG. 5, detailed description is omitted.

To begin with, as the user presses user setup key 89 and then inputs a special code "8-6" through ten-key pad 83, a simulation mode shown in FIG. 5A appears so that setting content table 101, setting item table 102 of FIG. 5B and setup input selector 103 of FIG. 5C are displayed. The setting of the transfer potential can be designated separately for the front side and for the back side. As the standard value "350" is set and the permissible setup range (this will be defined as the first setup range) is set to be "0 to 800". This value indicates the voltage, represented in 1/n times of the actual voltage. Though the usually expected setup range (this will be defined as the second setup range) is about 300 to 400 since the standard value is "350", the first setup range is taken wider than the second setup range so that the machine can be evaluated at the development stage.

Here, the second setup range may have been set beforehand based on the standard value (default value) or may be determined by controller 51 so as to be a predetermined range based on the input revised settings. When controller 51 sets up the second setup range, the range may be determined to be a predetermined numeric range taking the current setting stored in first setup storage 58a as the middle value. Also in this case, the second setup range should be determined to fall within the first setup range. In the example hereinbelow, it is assumed that the second setup range has been determined beforehand based on the standard value.

Figure 11:
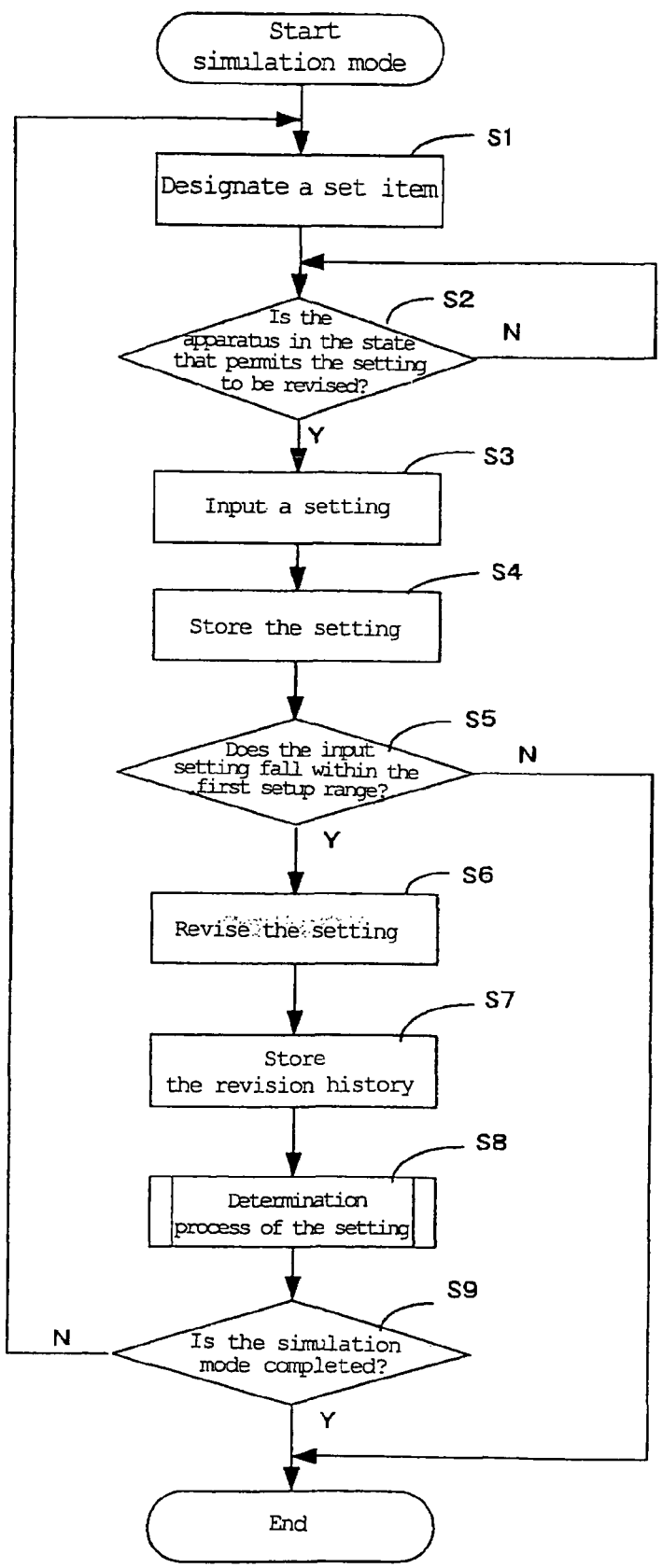
FIG. 11 is a flow chart showing a process of revising a setting.
Figure 12:
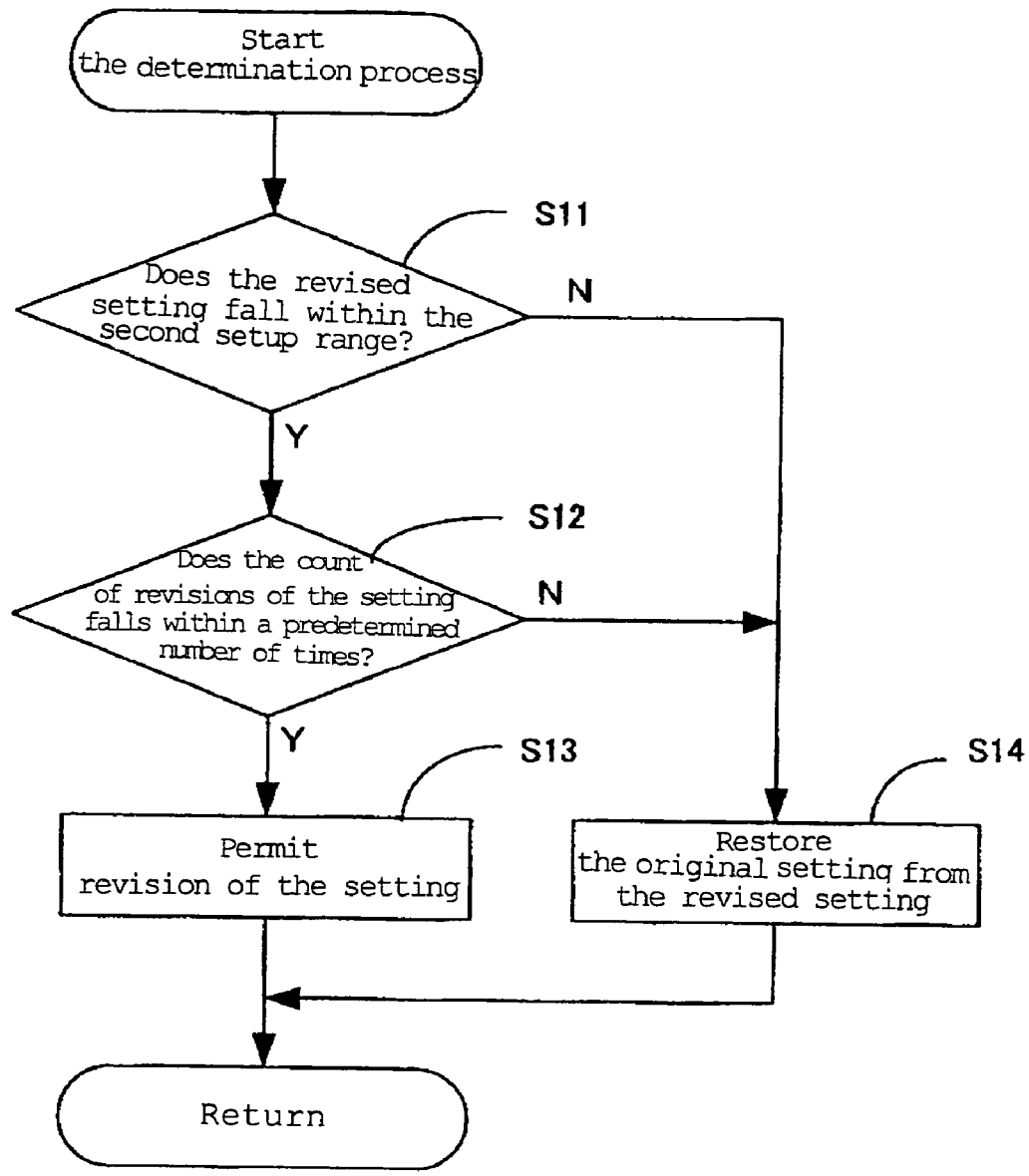
FIG. 12 is a flow chart showing a determination process.

At the stage in which items to be set are being displayed, the user inputs the figure corresponding to the set item to be revised via ten-key pad 83 to designate the set item as shown in FIG. 11 (Step S1). In this case, it is assumed that "FRONT: front side print mode" was selected by input of "1".

Next, when the apparatus gets into the state in which the setting can be revised as the user presses start key 84 (Step S2; Yes), revised setting "400" is input through ten-key pad 83 (Step S3). Pressing start key 84 causes the setting before revision, "350" to be stored into third storage 58c while the newly input set value, "400" is stored into second setup storage 58b (Step S4).

Here, controller 51 determines whether the input setting, that is, the setting stored in second setup storage 58b, falls within the first setup range (Step S5). If this setting falls out of the first setup range (Step S5; No), the revision should not be made since the input value falls out of the permissible setup range. That is, the operation is ended as it is without rewriting the setting in first setup storage 58a. In this case, a notice "the setting will not be revised because the input setting falls out of the permissible setup range" is displayed on display portion 81 to warn the user.

Then, when the input setting falls within the first setup range (Step S5; Yes), the setting in first setup storage 58a is replaced by the setting in second setup storage (Step S6). Since the input setting in FIG. 5C is "400", it falls within the first setup range, so that operation goes to Step S6, where the setting "350" in first setup storage 58a (in display 104) is replaced by the setting "400" of second setup storage 58b (in display 105).

Since the setting was revised, the revision history including the content of the set item and data of the setting is recorded in revision history storage 59 (Step S7). Then, a determination process of the revised setting is performed (Step S8).

After the determination process, it is made sure whether the simulation mode is ended (Step S9). If setup for another item needs to be revised instead of ending the simulation mode (Step S9; No), the operation returns to Step S1, and another setup process is started by selecting a new item. For example, it is possible to trace back the setup input displays by pressing user setup key 89, or the setup input display may be traced back when no input has been made for 30 seconds or longer. When clear-all key 86 is pressed, the simulation mode is ended (Step S9; Yes).

In the above way, when a setting that falls out of the permissible input range is input, it is possible to secure the operation of the apparatus by prohibiting rewriting of the basic settings by determining that the input value is wrong.

When the operational conditions for the basic settings of the apparatus or the default values of the apparatus were revised in the simulation mode, the propriety of the input settings are checked at Step S8. This determination process will be described with reference to FIG. 12.

Description will be made taking an example of the case of the transfer potential in FIG. 5. Since the usually expected setup range to be input from control portion 8 is about 300 to 400 (the second setup range), it is determined first whether the input setting falls within this range (Step S11). If it does not fall within the second setup range (Step S11; No), controller 51 determines that the input setting is not proper, and reads out the setting before revision from third setup storage 58c and rewrites the settings in first setup storage 58a with this read-out setting (Step S14). At the same time, a notice "the original settings will be restored because the input setting falls out of the proper range" is displayed on display portion 81 to warn the user.

When the setting falls within the first setup range (Step S11; Yes), the operation goes to Step S12. Since the input setting in FIG. 5C is "400" (in display 104), it is within the second setup range, and the operation goes to Step S12.

At Step S12, controller 51 counts the number of times the same setup items have been revised, i.e., the number of times of revising the transfer potential, from revision history storage 59, so as to determine whether the number of times is equal to or lower than a predetermined number of times, e.g., 10 times per year (Step S12). If the count is equal to or below the predetermined number of times (Step S12; Yes), the controller determines that the revision is pertinent and permits revision of the setting (Step S13) and the set value stored in first setup storage 58a is kept as it was revised.

On the other hand, if the number of times of revising the setting is greater than the predetermined number (Step S12; No), the controller determines that an inexperienced user is revising the setting as a test trial and regards that no proper revision is performed. Accordingly, the controller rejects the revision to the input setting stored in second setup storage 58b and reads out the settings before revision stored in third setup storage 58c so as to rewrite the setting in first setup storage 58a with the setting before revision (Step S14). At the same time, a notice "the original setting will be restored because the number of setting revision times exceeds the predetermined count" is displayed on display portion 81 to warn the user.

In the above way, even if a wrong setting is input to first setup storage 58a in which the basic settings have been stored, it is possible to restore the original condition because the basic settings have been backed up by third setup storage 58c, hence it is possible to secure the operation of the apparatus. Particularly, even if a numeric value was set within the permissible input range (first setup range), when the input numeric value falls out of the practical usage setup range (second setup range), the input setting is determined to be wrong and the basic settings before revision are restored, whereby the operation of the apparatus can be secured.

Further, since the revision history of the setting is stored in revision history storage 59, it is possible to recognize that, if the same item has been revised a predetermined number of times or more, the revisions have been done by an inexperienced manager. Accordingly, in this case, even if the input setting falls within the predetermined range, there is a possibility of an operational error occurring in other control, so that the basic settings can be restored to the original status.

Herein, the present invention should not be limited to the above illustrated example, but it is apparent that various modifications can be added without departing from the spirit or scope of the present invention.

What is claimed is:

1. An image forming apparatus comprising:
a first storage for storing basic settings of the apparatus;
an input portion for receiving input of a revised setting for revising the basic settings stored in the first storage;
a second storage for storing the revised setting input through the input portion;
a third storage for storing the basic settings before revision that have been stored in the first storage; and
a controller, wherein the controller performs the steps of:
determining whether the input revised setting falls within a predetermined range;
rewriting the basic settings stored in the first storage with the revised setting stored in the second storage when the revised setting falls within the predetermined range; and,
rewriting the settings stored in the first storage with the basic settings stored in the third storage when the revised setting falls out of the predetermined range,
wherein a first setup range of the basic setting is defined as a predetermined range within which a setting is permissible as the basic setting, and the controller will not rewrite the basic settings stored in the first storage when the input revised setting falls out of the first setup range, and
a second setup range of the basic setting is defined as a range within which the basic setting is practically set, and the controller further performs the steps of:
temporarily rewriting the basic settings stored in the first storage with the revised setting stored in the second storage when the input revised setting falls within the first setup range;
keeping the revised setting, stored in the first storage by revision as is when the revised setting falls within the second setup range; and
rewriting the revised setting stored in the first storage with the basic setting stored in the third storage when the revised setting, stored in the first storage by revision falls out of the second setup range.

2. The image forming apparatus according to claim 1, wherein the second setup range is narrower than the first setup range.

3. The image forming apparatus according to claim 1, wherein when the basic settings stored in the first storage are not rewritten with the input revised setting, the controller gives a notice of that effect.

4. The image forming apparatus according to claim 1, wherein the image forming apparatus is a scanner device, printer device, copier or a composite product having the functions in combination.

5. An image forming apparatus, comprising:
a first storage for storing basic settings of the apparatus;
an input portion for receiving input of a revised setting for revising the basic settings stored in the first storage;
a second storage for storing the revised setting input through the input portion;
a third storage for storing the basic settings before revision that have been stored in the first storage;
a controller, wherein the controller performs the steps of:
determining whether the input revised setting falls within a predetermined range;
rewriting the basic settings stored in the first storage with the revised setting stored in the second storage when the revised setting falls within the predetermined range; and
rewriting the settings stored in the first storage with the basic settings stored in the third storage when the revised setting falls out of the predetermined range; and
a revision history storage for storing the setup revision history including the number of setting revision times, wherein the controller, based on the setup revision history of the revision history storage, rewrites the revised setting stored in the first storage with the basic setting stored in the third storage when revisions of the same setting have been performed a predetermined number of times or more,
wherein a first setup range of the basic setting is defined as a predetermined range within which a setting is permissible as the basic setting, and the controller will not rewrite the basic settings stored in the first storage when the input revised setting falls out of the first setup range,
wherein a second setup range of the basic setting is defined as a range within which the basic setting is practically set, and the controller further performs the steps of:
temporarily rewriting the basic settings stored in the first storage with the revised setting stored in the second storage when the input revised setting falls within the first setup range;
keeping the revised setting, stored in the first storage by revision as is when the revised setting falls within the second setup range; and
rewriting the revised setting stored in the first storage with the basic setting stored in the third storage when the revised setting, stored in the first storage by revision falls out of the second setup range.

6. The image forming apparatus according to claim 5, wherein when the basic settings stored in the first storage are not rewritten with the input revised setting, the controller gives a notice of that effect.

7. The image forming apparatus according to claim 5, wherein the image forming apparatus is a scanner device, printer device, copier or a composite product having the functions in combination.

8. The image forming apparatus according to claim 5, wherein the second setup range is narrower than the first setup range.

* * * * *